(12) United States Patent
Fang et al.

(10) Patent No.: US 12,123,855 B2
(45) Date of Patent: Oct. 22, 2024

(54) CHROMATOGRAPHIC ANALYSIS DEVICE EMPLOYING MULTI-FUNCTION INTEGRATED PROBE, AND USE METHOD

(71) Applicant: Zhejiang University, Hangzhou (CN)

(72) Inventors: Qun Fang, Hangzhou (CN); Di Qiong Jin, Hangzhou (CN); Jian Zhang Pan, Hangzhou (CN); Guan Sheng Du, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 238 days.

(21) Appl. No.: 17/273,181

(22) PCT Filed: Dec. 2, 2019

(86) PCT No.: PCT/CN2019/122343
§ 371 (c)(1),
(2) Date: Mar. 3, 2021

(87) PCT Pub. No.: WO2020/114344
PCT Pub. Date: Jun. 11, 2020

(65) Prior Publication Data
US 2021/0325351 A1   Oct. 21, 2021

(30) Foreign Application Priority Data

Dec. 5, 2018 (CN) .................. 201811478061.3

(51) Int. Cl.
*G01N 30/16* (2006.01)
*G01N 30/02* (2006.01)
(Continued)

(52) U.S. Cl.
CPC ............. *G01N 30/16* (2013.01); *G01N 30/06* (2013.01); *G01N 30/7233* (2013.01); *G01N 2030/027* (2013.01); *G01N 2030/067* (2013.01)

(58) Field of Classification Search
CPC .... G01N 30/16; G01N 30/06; G01N 30/7233; G01N 2030/027; G01N 2030/067; G01N 30/02
See application file for complete search history.

(56) References Cited

U.S. PATENT DOCUMENTS

2002/0110902 A1* 8/2002 Prosser ................. G01N 35/10
435/287.1
2011/0220784 A1 9/2011 Roach et al.

FOREIGN PATENT DOCUMENTS

CN            1740779 A        3/2006
CN         101666786 A   *    3/2010
(Continued)

OTHER PUBLICATIONS

PCT/CN2019/122343, International Search Report and Written Opinion, mailed Feb. 26, 2020, 10 pages. (no translation).
(Continued)

*Primary Examiner* — Jill A Warden
*Assistant Examiner* — Michael Paul Shimek
(74) *Attorney, Agent, or Firm* — Getech Law LLC; Jun Ye

(57) ABSTRACT

The present invention discloses a chromatographic analysis device based on a multifunctional integrated probe, and a use method of the chromatographic analysis device. The chromatographic analysis device integrates chromatographic sampling, sample injection and separation functions into the integrated probe. Meanwhile, the present invention further discloses a method for performing microsample analysis by the chromatographic analysis device based on
(Continued)

the multifunctional integrated probe. The present invention has the main advantages as follows: the device is high in integration level, small in dead volume, simple in structure, convenient to use and particularly suitable for microsample analysis with a small sample amount, provides a new chromatographic sample injection mode for chromatographic analysis, and provides an ideal platform for chromatographic analysis and on-site chromatographic analysis of a trace amount of samples.

14 Claims, 3 Drawing Sheets

(51) Int. Cl.
*G01N 30/06* (2006.01)
*G01N 30/72* (2006.01)

(56) References Cited

FOREIGN PATENT DOCUMENTS

| CN | 101923079 A | 12/2010 |
|----|-------------|---------|
| CN | 104392886 A | 3/2015 |
| CN | 107422059 A | 12/2017 |
| CN | 108593755 A | 9/2018 |
| JP | 2005190767 A | 7/2005 |

OTHER PUBLICATIONS

CN201811478061.3—First Office Action mailed on Sep. 27, 2020, 14 pages.
CN201811478061.3—Notice of Grant mailed on Mar. 16, 2021, 4 pages.

* cited by examiner

CHROMATOGRAPHIC ANALYSIS DEVICE EMPLOYING MULTI-FUNCTION INTEGRATED PROBE, AND USE METHOD

CROSS-REFERENCE TO RELATED APPLICATIONS

This application claims the benefit of and priority to International Patent Application No. PCT/CN2019/122343 filed Dec. 2, 2019, and Chinese Patent Application No. 201811478061.3 filed on Dec. 5, 2018, the entire contents of which are incorporated herein by reference.

TECHNICAL FIELD

The present invention belongs to the field of chromatographic analysis, and particularly relates to a chromatographic analysis device based on a multifunctional integrated probe and for a microsample, and a use method of the chromatographic analysis device.

BACKGROUND

In the analysis of samples with complex composition, the chromatographic analysis technology has been widely applied due to its powerful separation capability. The high performance liquid chromatography and the gas chromatography have become important separation and analysis technologies in the fields of chemistry, biomedicine, agriculture, environment, food, commodity inspection and the like.

Generally, a typical chromatographic separation and analysis process includes: injecting the sample into a chromatographic column loaded with a stationary phase through a sample injection valve, taking liquid or gas as a mobile phase, pumping the mobile phase into the chromatographic column by a high-pressure driving system, separating the components with different properties in the sample and then entering a detector for detection, thus realizing separation and analysis of the sample.

At present, the mass spectrometry detector is most widely used in combination with the chromatographic system. The mass spectrometry detection technology has the characteristics of high specificity and high sensitivity. The electrospray mass spectrometry detection technology is the most widely used mass spectrometry detection technology combined with the chromatographic system. The electrospray mass spectrometry detection technology has the characteristics of high sensitivity, high analysis speed, high molecular structure analysis capability and the like. The literature has reported a variety of in-situ sample direct analysis methods based on the electrospray mass spectrometry detection technology. For example, the Cooks research group (Takeouts, Z.; Wiseman, J.; Cooks, R. J. Mass. Spectrom. 2005, 40, 1261-1275) developed the desorption electrospray ionization (DESI) technology, which desorbs and ionizes the surface sample by high-speed charged droplet flow under the assistance of high-pressure gas flow and enables the sample to directly enter the mass spectrometry for detection. The Laskin research group (Roach, P.; Laskin, J.; Laslin, A. Analyst 2010, 135, 2233-2236.) developed the nano-desorption electrospray ionization (nano-DESI) technology, which connects a buffer solution system and a nano-spray needle by a liquid bridge, extracts sample molecules from the to-be-analyzed surface and may perform continuous extraction and direct ionization of the sample molecules. The paper spray technology developed by Wang, etc.(Wang, H.; Liu, J.; Cooks, R.; Quyang, Z. Angew. Chem. Int. Ed. 2010, 49, 877-880.) combines the paper chromatography with the electrospray technology to enable the sample to be sprayed through the tip of porous paper under the combined action of the solvent and high voltage. However, due to the complex composition and great abundance difference of the actual biological samples, the presence of the high-concentration matrix in the sample, particularly metal salt ions, will seriously restrict the sensitivity and accuracy of the mass spectrometry detection. In order to reduce the influence of the matrix components in the sample on the mass spectrometry detection, it is necessary to perform pretreatment, such as solid phase extraction or chromatographic separation, etc., on the sample before mass spectrometry detection and then transfer the treated sample to the mass spectrometry through an interface. However, in the conventional analysis system, the above process is tedious and time-consuming, high in consumption of samples, liable to cause sample loss and pollution, and not suitable for treating the microsample.

Research on the chromatographic analysis method of the complex microsample is one of the research hotspots in the field of chromatographic analysis (especially the chromatography-mass spectrometry combined analysis). Although the classical chromatographic analysis system has the advantages of high separation capability, high reliability and the like, it also has the limitations of high instrument cost, high sample consumption, remarkable extra-column effect and the like. From the sample injection valve to the detector, there is large dead volume in the sample injection valve, the column joint, the connecting pie and the detector flow cell, thereby diffusing and retaining the separated substances and reducing the broadening of the chromatographic peak and the separation efficiency of the chromatographic column Therefore, it is a great challenge to realize the chromatographic analysis of the complex microsample.

Some literatures have reported the chromatographic analysis methods applied to the microsamples. For example, Ovchinnikova, etc. (Ovchinnikova, O.; Kertesz, V.; Van Berkel, G. Anal. Chem. 2011, 83, 1874-1878.) introduced the surface sample into the internal solvent through the opening of the PEEK tube after desorption of the surface sample by laser, and the surface sample entered the chromatography-mass spectrometry analysis system through switching of the six-way valve, thus realizing direct microarea sampling and chromaticness analysis of the biological slice surface. However, the method is high in instrument cost and use cost. Kertesz, etc. (Kertesz, V.; Van Berkel, G. Anal. Chem. 2010, 82, 5917-5921.) sampled the biological slice or droplet by the micro-liquid bridge surface sampling probe (LMJ-SSP) technology, the sample entered the HPLC-MS analysis system through switching of the three-way or six-way valve, and the separated components are sequentially subjected to the conventional electrospray mass spectrometry detection. However, the above method still has many shortcomings in the aspects of system integration level, operation convenience, interface dead volume, and sample loss rate.

SUMMARY

The present invention provides a chromatographic analysis device based on a multifunctional integrated probe and for a microsample, and a use method of the chromatographic analysis device. The chromatographic analysis device integrates chromatographic sampling, sample injection and separation functions into the integrated probe.

Meanwhile, the present invention further provides a method for performing microsample analysis by the chromatographic analysis device based on the multifunctional integrated probe.

The present invention has the main advantages as follows: the device is high in integration level, small in dead volume, simple in structure, convenient to use and particularly suitable for microsample analysis with a small sample amount, provides a new chromatographic sample injection mode for chromatographic analysis, and provides an ideal platform for chromatographic analysis and field chromatographic analysis of a trace amount of samples.

The present invention has wide application prospect in the fields of high-throughput screening and analysis, single cell/single particle analysis, complex microsample analysis, bioimaging analysis, field analysis and the like.

A chromatographic analysis device based on a multifunctional integrated probe includes a fluid driving device and a detection device, and further includes:

a sample chip, configured to load a sample;

a probe, having a mobile phase introduction channel, a sampling channel port, a chromatographic column channel and a chromatographic column channel outlet, an outlet of the mobile phase introduction channel connecting with an inlet of the chromatographic column channel, and the sampling channel port being formed at the connection position and serving as a sampling channel port for completing a sampling probe function; and a moving stage, configured to adjust the relative position between the sample chip and the multifunctional integrated probe, wherein an inlet of the mobile phase introduction channel is connected to the fluid driving device, and an outlet of the chromatographic column channel corresponds to a position of the detection device.

The probe of the present invention can be of an integrated structure, can also be of a detachable split structure, and can serve as modular design.

Preferably, the probe has a structure integrating a mobile phase introduction channel, a sampling channel port, a chromatographic column channel and a chromatographic column channel outlet. Further preferably, the probe is formed by bending a capillary tube.

Preferably, the probe has a U-shaped structure, a V-shaped structure, a similar U-shaped structure or a similar V-shaped structure formed by bending a capillary tube; the sampling channel port is formed at the bottom of the U-shaped structure or the V-shaped structure; capillary tube parts on two sides of the sampling channel port are the mobile phase introduction channel and the chromatographic column channel respectively; and a mobile phase outlet of the chromatographic column channel is the chromatographic column channel outlet.

According to the present invention, the capillary tube can be a capillary glass tube, a capillary metal tube or a capillary tube made of other materials.

Preferably, a chromatographic stationary phase located in the probe fills part of the mobile phase introduction channel and all of the sampling channel port and the chromatographic column channel; or the chromatographic stationary phase fills all of the chromatographic column channel.

Preferably, the probe includes:

a probe body with a mobile phase introduction channel, a sampling channel port and a chromatographic column channel; and a chromatographic column, one end of the chromatographic column being connected with the chromatographic column channel and the mobile phase outlet of the chromatographic column being the chromatographic column channel outlet.

Preferably, the mobile phase introduction channel and the chromatographic column channel are arranged in a U shape or a V shape, and the sampling channel port is located at the bottom of the U shape or the V shape.

Preferably, the chromatographic analysis device includes a sealing sheet which can be configured to seal the sampling channel port. The sealing sheet can seal the sampling channel port; washing liquid can be added on the sealing sheet dropwise for cleaning the sampling channel port of the multifunctional integrated probe and stably forming a sampling droplet.

Of course, the present invention can choose not to install the sealing sheet, and the sample can be loaded, dissolved and washed directly by the sample chip. At this time, the sample can be dissolved and sampled directly by a mobile phase passing through the sampling channel port; or the sample can be dissolved and sampled through the sampling droplet formed at the sampling channel port. The sampling droplet can be formed by the mobile phase and can also be the washing liquid or a droplet with other composition.

Preferably, the top surface of the sample chip has elasticity. By the technical solution, the sealing property between the sampling channel port and the sample chip can be further improved.

Preferably, the detection device is an electrospray mass spectrometer detection device, and the chromatographic column channel outlet serves as a spray needle of the electrospray mass spectrometry detection device.

A method for analyzing a sample includes the following steps: driving a mobile phase in a probe by a fluid driving device under the condition that a sampling channel port of the probe is sealed; dissolving a sample carried on the sample chip by liquid located at the sampling channel port and entering a chromatographic column channel to realize sample injection; driving the mobile phase by the fluid driving device under the condition that the sampling channel port of the probe is sealed to separate the sample entering the chromatographic column channel; and detecting the separated sample by the detection device.

A method for analyzing a sample, performing analysis by the chromatographic analysis device defined as any one of the above technical solutions, includes the following steps: driving a mobile phase in a probe by a fluid driving device under the condition that a sampling channel port of the probe is sealed; dissolving a sample carried on the sample chip by liquid located at the sampling channel port under the normal pressure or by liquid flowing through the sampling channel port under the condition that the sampling channel port of the probe is sealed by the sample chip, and entering a chromatographic column channel to realize sample injection; driving the mobile phase by the fluid driving device under the condition that the sampling channel port of the probe is sealed by a sealing sheet or a sample chip to separate the sample entering the chromatographic column channel; and detecting the separated sample by the detection device.

The present invention will be further described hereafter:

a chromatographic analysis device based on a multifunctional integrated probe and for a microsample includes:

a multifunctional integrated probe, integrating a mobile phase introduction channel, a sampling channel and a chromatographic column channel;

a fluid driving device, configured to provide a liquid chromatography mobile phase, the fluid driving device being connected to an inlet of the mobile phase introduction channel;

a sealing sheet, configured to seal the sampling channel port of the multifunctional integrated probe;

a detection device for liquid chromatography; and a moving stage, configured to adjust the relative position between the sample chip and the multifunctional integrated probe.

According to the present invention, a mobile phase introduction channel with an inlet and an outlet and a chromatographic column channel with an inlet and an outlet are fabricated on the multifunctional integrated probe, the outlet of the mobile phase introduction channel connects with the inlet of the chromatographic column channel, and the connection position serves as a sampling channel port for completing a function of sampling the probe; and during sampling operation, the sampling channel port communicates with or is contact with a micro-structure or micro-area for loading the sample on the sample chip.

According to the present invention, the material of the multifunctional integrated probe is an inorganic material (including glass, quartz, silicon or metal, etc.), an organic material, a macromolecular polymer material or a composite material consisting of the above materials.

According to the present invention, the cross section of each of the mobile phase introduction channel, the chromatographic column channel and the sampling port in the multifunctional integrated probe is shaped like a circle, an ellipse, a square, a trapezoid or other polygons; the inner diameter (diameter) or the inner side length of each of the mobile phase introduction channel, the chromatographic column channel and the sampling port in the multifunctional integrated probe ranges from 0.05 μm to 1 cm; and the outer diameter (diameter) or the outer side length of the sampling port in the multifunctional integrated probe is 0.1 μm to 10 cm.

According to the present invention, the multifunctional integrated probe can be fabricated on the basis of a capillary tube. During fabricating, the capillary tube is bended firstly, and the bending part is of a U shape, an arc shape, a square shape, a V shape or other shapes. The fabricating method can be a high-temperature method, a mechanical method or a mold method, etc. according to different materials of the capillary tubes. The sampling channel port is fabricated at a protruded area of the bending part of the capillary tube, and the fabricating method can be a grinding method, a corrosion method, a laser fabricating method, a drilling method, a cutting method or a needle-punching method and the like according to different materials of the capillary tubes. The outer part of the capillary tube is coated or filled with a material capable of enhancing the structural strength of the capillary tube, such as solid glue, metal, polymer material or other materials and the like, so as to enhance the strength of the multifunctional integrated probe based on the capillary tube, thus improving pressure-resistant capability of a closed interface between the probe and the sealing sheet or the sample chip.

According to the present invention, the multifunctional integrated probe (or the probe body) can be integrally fabricated by a solid material or a microfluidic chip. Preferably, the multifunctional integrated probe is fabricated by a hard solid material, such as stainless steel, glass, quartz, a polyether-ether-ketone (PEEK) material or other materials, etc. To facilitate fabricating, the integral multifunctional integrated probe can be modified by a commercial three-way or four-way device.

According to the present invention, in the chromatographic analysis device based on the multifunctional integrated probe and for the microsample, the sample chip for loading the sample is fabricated with a micro-structure or micro-area for loading the sample, including a concave microwell, a convex microwell or a specific area with a surface subjected to selective hydrophilic or hydrophobic treatment, or a surface of the chip is directly used for loading the sample depending on the hydrophilicity and the hydrophobicity of the chip material itself without surface treatment. A material of the sample chip for loading the sample is an inorganic material (including glass, quartz, silicon or metal, etc.), an organic material, a macromolecular polymer material or a composite material consisting of the above materials.

According to the present invention, the material of the multifunctional integrated probe, the material of the sample chip for loading the sample and the material of the sealing sheet can independently select an inorganic material (including glass, quartz, silicon or metal, etc.), an organic material, a macromolecular polymer material or a composite material consisting of the above materials. To simplify the system, the sample chip can be directly used as the sealing sheet, the sampling channel port on the integrated probe device is sealed by the part for loading the sample on the sample chip to complete direct sampling operation, or and the sampling channel port on the integrated probe device is sealed by a part not loading the sample on the sample chip to complete mobile phase introduction operation.

To improve the sealing reliability and pressure-resistant capability of the sampling channel port of the multifunctional integrated probe, preferably, the material of the sealing sheet or the material of the sample chip has a hardness difference from the material of the sampling channel port of the integrated probe device, or one or both of the two materials are elastic materials, which is beneficial to realizing more reliable and pressure-resistant sealing. In addition, the elastic sealing material can be mounted at the contact part of the sealing sheet or the sample chip and the sampling channel port of the integrated probe device, or the elastic sealing material is mounted at the sampling channel port of the integrated probe device.

According to the present invention, the sample carried on the sample chip is a liquid sample or solid sample. The volume of the liquid samples range from $1\times10^{-20}$ L to $1\times10^{-3}$ L, and the mass of the solid samples range from $1\times10^{-22}$ g to $1\times10^{-3}$ g.

During sample analysis, the multifunctional integrated probe is directly used for sample analysis after the liquid sample or solid sample is added to the micro-structure or micro-area for loading the sample on the sample chip, or the multifunctional integrated probe is used for sample analysis after the sample added to the micro-structure or micro-area of the sample chip and subjected to a series of sample pretreatment and reaction steps, or the liquid sample or solid sample is subjected to sample pretreatment and reaction on other devices before being added to the sample chip. Preferably, for the microsamples, such as single cell, single particle, subcellular organelle or microbiological tissue samples, etc., a method that adding the sample on the sample chip and then performing sample pretreatment and reaction is beneficial to reducing the loss of the microsample in the process of sample transmission, pretreatment and reaction and improving the detection sensitivity.

According to the present invention, the initial state of the samples is liquid sample, solid sample, liquid-solid mixture sample or a solid sample formed after the liquid sample is evaporated and dried.

In the process of sample pretreatment, reaction and analysis, evaporation of the liquid sample is prevented by covering oil, controlling humidity or other measures for preventing liquid evaporation; or in the middle or ending stage of sample pretreatment and reaction, the liquid sample is evaporated and dried into a solid sample; or in the middle stage of sample pretreatment and reaction, a solvent is added to redissolve the solid sample into a liquid sample after the sample is evaporated and dried into the solid sample.

According to the present invention, the structure of the chromatographic column with a chromatographic stationary phase used in the multifunctional integrated probe in the chromatographic analysis device is a packed column, an open tubular column, a chemically synthesized monolithic column, a microfabricating monolithic column or a composite structure of the above structures. The fabricating method of the chromatographic column is to directly fabricate the chromatographic column in the chromatographic column channel in the multifunctional integrated probe, or fabricate the chromatographic column outside the device in advance and then mount the chromatographic column on the multifunctional integrated probe to connect with the chromatographic column channel on the multifunctional integrated probe. Preferably, when the chromatographic column is directly fabricated at the chromatographic column channel in the multifunctional integrated probe, the distance and a dead volume from the chromatographic stationary phase to the sampling channel port should be reduced as far as possible, which is beneficial to reducing the transmission loss of the sample and the diluted effect of the sample. Preferably, when the chromatographic column fabricated outside the device in advance is mounted in the multifunctional integrated probe, the distance and the dead volume from the inlet of the chromatographic column to the inlet of the chromatographic column channel and the sampling port should be reduced as far as possible, which is beneficial to reducing the transmission loss of the sample and the diluted effect of the sample. It should be noted that if necessary (for example, it is necessary to facilitate fabricating or reduce the dead volume of the interface, etc.), the stationary phase of the chromatographic column can be fabricated or filled into part or all of the spaces of the mobile phase introduction channel and the sampling channel port.

According to the present invention, the use method of the chromatographic analysis device based on the multifunctional integrated probe and for the microsample includes the following steps:

(a) adding a to-be-analyzed sample to a micro-structure or a micro-area for loading the sample on the sample chip;

(b) performing pretreatment and reaction operation to the sample on the sample chip;

(c) fixing the sample chip to a moving stage, or fixing the multifunctional integrated probe to a moving stage, or respectively fixing the sample chip and the multifunctional integrated probe to different moving stages;

(d) moving the moving stage to move the sampling channel port on the multifunctional integrated probe in contact with a sealing sheet and realize sealing; starting the fluid driving device, injecting a chromatographic mobile phase from an inlet of a mobile phase introduction channel of the multifunctional integrated probe, passing through the sampling channel port, entering a chromatographic column channel and flowing out of the outlet of the chromatographic column channel; and starting a detection device of a chromatographic system to acquire a stable detection signal;

(e) pausing the fluid driving device, moving the moving stage to make the sampling channel port on the multifunctional integrated probe out of contact with a sealing sheet and make a sampling droplet formed outside the sampling channel port in contact with a sample of the micro-structure or micro-area carried on the sample chip, dissolving the sample into the sampling droplet, and introducing the sampling droplet dissolved with the sample into the chromatographic column channel and the chromatographic stationary phase in the chromatographic column channel by surface tension of the sampling droplet, a capillary force in the chromatographic column channel, a suction force from the chromatographic column channel outlet or other types of suction forces in the chromatographic column channel; and controlling the moving stage to move to make the sampling droplet at the sampling channel port on the multifunctional integrated probe out of contact with the sample chip;

(f) moving the moving stage to make the sampling channel port on the multifunctional integrated probe in contact with a sealing sheet and realize sealing; starting the fluid driving device, injecting a chromatographic mobile phase from an inlet of the mobile phase introduction channel of the multifunctional integrated probe, passing through the sampling channel port, carrying the sample to enter the chromatographic column channel and the chromatographic stationary phase in the chromatographic column channel, separating components in the sample, and enabling the separated component in the sample to flow out from the chromatographic column channel port; and starting the detection device of the chromatographic system to acquire a detection signal of the separated sample component; and (g) repeating the above operation steps from (a) to (f) to complete sampling and analysis of different samples on the chip, different spatial positions of the same sample or samples on different chips.

According to the present invention, the operation (d) in the above operation steps can be omitted to simplify operation and shorten operation and analysis time.

According to the present invention, the operations (e) and (f) in the above operation steps are combined, that is, not to perform contact sampling on the sample on the sample chip by a sampling droplet formed outside the sampling channel port, but to move the moving stage to make the sampling channel port on the multifunctional integrated probe in contact with the micro-structure or micro-area for loading the sample on the sample chip and realize sealing between the sampling channel port and the sample chip; start the fluid driving device, inject the mobile phase from the inlet of the mobile phase introduction channel of the multifunctional integrated probe, pass through the sampling channel port, carry the sample carried on the micro-structure or micro-area on the sample chip to enter the chromatographic column channel and the chromatographic stationary phase in the chromatographic column channel, separate components in the sample, and enable the separated component in the sample to flow out from the chromatographic column channel port; and start the detection device of the chromatographic system to acquire a detection signal of the separated sample component.

According to the present invention, the method for making the sampling channel port on the multifunctional integrated probe in contact with the sealing sheet and realize sealing is to realize pressure-resistant sealing of the sampling channel port of the multifunctional integrated probe and the sealing sheet by controlling the moving stage to generate mutual pressing operation, mutual insertion operation, mutual translation operation, screw screwing operation, or other types of moving or rotating operations of the sampling channel port and the sealing sheet.

According to the present invention, the pressure-resistant degree or capability of the sealing position between the sampling channel port of the multifunctional integrated probe and the sealing sheet needs to be such that there is no or no obvious liquid leakage at the sealing position of the sampling channel port and the sealing sheet in the sampling process or in the process of introducing the mobile phase into the chromatographic column.

According to the present invention, preferably, when sealing between the sampling channel port of the multifunctional integrated probe and the sealing sheet is sealed, shortening the contact area between the sampling channel port of the multifunctional integrated probe and the sealing sheet is beneficial to improving the pressure-resistant capability at the sealing interface. Improving the pressure-resistant capability at the sealing interface between the sampling channel port of the multifunctional integrated probe and the sealing sheet is beneficial to increasing a pressure in the chromatographic system and is beneficial to adopting a chromatographic column with a larger length or a thinner inner diameter or a stationary phase packed chromatographic column with thinner particles, so as to improve the separation efficiency, separation speed and detection sensitivity of chromatographic separation.

According to the present invention, the surface around the sampling channel port is subjected to area selective surface modification according to the property of the sampling sample solutions, so that the surface and the sample solutions have an affinity function, thus improving sampling stability. Preferably, the surface of an outer wall of the sampling channel port is subjected to hydrophobic treatment, thereby reducing cross pollution. The hydrophobic treatment includes silanization, fluoroalkylation, polymer coating or other hydrophobic surface treatment methods.

According to the present invention, in the sampling process, the mobile phase carries the sample carried on the micro-structure or micro-area on the sample chip to enter the chromatographic column channel, which means that the mobile phase carries all or most of the sample to enter the chromatographic column channel for separation and analysis at one time, or the mobile phase gradually elutes the sample carried on the micro-structure or micro-area on the sample chip to enter the chromatographic column channel for separation and analysis, or components with different properties in the sample carried on the micro-structure or micro-area on the sample chip are gradually eluted by changing the composition and concentration of the mobile phase to enter the chromatographic channel for separation and analysis.

According to present invention, composition and flow of the mobile phase carrying or eluting the sample to enter the chromatographic column channel for separation and analysis can be the same as or different from the condition of the mobile phase used in the subsequent chromatographic separation. The main consideration is how to facilitate sampling and sample injection operations. If necessary, a gas mobile phase can be used for completing sampling and sampling injection operations and then a liquid mobile phase is used for performing chromatographic separation operation.

According to the present invention, during sampling analysis for multiple samples, after one sample is subjected to sampling analysis and before the next sample is subjected to sampling analysis, cleaning liquid is added to the sealing sheet or the sample chip and the sampling port part of the multifunctional integrated probe is soaked immersed into the cleaning liquid for cleaning, thereby reducing cross contamination among different samples. Meanwhile, when the sampling channel port is separated from the cleaning liquid, the carried liquid can also serve as a sampling droplet.

According to the present invention, a detection method adopted by the detection device of the chromatographic system is a spectroscopic analysis method, an electrochemical analysis method, a mass spectrometry method, other types of analysis methods (such as a frozen electronic microscope analysis method) or the combination of two or more of the above detection methods. The spectroscopic analysis method includes an ultraviolet-visible spectrophotometric method, a fluorescent spectrometric method, an infrared spectrometric method, a Raman spectrometric method, a nuclear magnetic resonance spectral method, an spectroscopic imaging analysis method, an spectroscopic sensing analysis method, an atomic spectrometric method, etc. The electrochemical analysis method includes a potentiometric analysis method, an electrolysis and coulometric analysis method, a voltammetry, a conductivity method, an electrochemical sensing analysis method, etc. The mass spectrometry analysis method includes an electron bombardment mass spectrometry, a field desorption mass spectrometry, a fast atom bombardment mass spectrometry, a matrix-assisted laser desorption mass spectrometry, an electrospray mass spectrometry, an in-situ ionization mass spectrometry, an inductively coupled plasma mass spectrometry, etc.

According to the present invention, multiple multifunctional integrated probes can form a probe array to perform multi-channel sample injection and chromatographic analysis operation for multiple samples of the sample chip in parallel, which is beneficial to increasing the analysis throughput of the system.

According to the present invention, the chromatographic analysis device based on the multifunctional integrated probe can be applied to microsample liquid chromatographic analysis, gas chromatographic analysis or supercritical fluid chromatographic analysis. Preferably, when the device is applied to the liquid chromatographic analysis, analyzing the complex sample by a gradient elution mode is beneficial to improving the separation effect and the peak capacity of the chromatographic column. When the device is applied to the gas chromatographic analysis, analyzing the complex sample by a programmed temperature rising mode is beneficial to improving the separation effect and the peak capacity of the chromatographic column It should be noted that the chromatographic analysis device based on the multifunctional integrated probe is applied not limited to the chromatographic analysis field, and can also be applied to the flow analysis fields of continuous flow analysis, bubble-segment flow analysis, flow injection analysis or capillary electrophoretic analysis and the like, or can be combined with the above-mentioned flow analysis systems for analysis.

The present invention has the main advantages as follows: (1) the device has high integration level, which integrates chromatographic sampling, sample injection and separation functions into the integrated probe, and is simple in structure, small in volume, low in fabricating cost and convenient to operate; (2) the chromatographic sampling, sample injection and separation functions are integrated in the integrated probe, so that on-line pretreatment and chromatographic separation of the microsamples can be realized, the pretreatment time of the sample is saved and the analysis speed and throughput are obviously increased; meanwhile, the above operation is easy to automate and is suitable for performing rapid separation and analysis and high-throughput screening analysis for a large number of samples; (3) by an integrated sample injection method, the pretreated sample directly enters the chromatographic and the subsequent detection system for analysis, so that the dead volume of the device is significantly reduced, the loss in the sample transfer and transportation process is reduced, and the analysis sensitivity and the analysis result are improved, thus making it especially suitable for analyzing microsamples or single cell/single particle samples with small sample amounts; (4) the integrated probe has small size and small sample injection amount, and can be applied to bioimaging analysis with high spatial resolution if the size of the sampling channel port is further reduced; (5) the present invention has important significance in fundamental and application research in the field of chromatographic analysis, the contradiction between normal pressure sampling-pretreatment-sample injection and high pressure sampling-chromatographic separation operation is solved cleverly by a simple method, and a new chromatographic sample injection mode is proposed to provide an ideal platform for chromatographic analysis and field chromatographic analysis and also provide an approach for miniaturization of chromatographic systems; and (6) the system using the present invention has a wide application prospect and is expected to be applied in important fields of high-throughput screening and analysis, single cell/single particle analysis, complex microsample analysis, bioimaging analysis, field analysis and the like.

In the accompanying drawings, 1—multifunctional integrated probe, 2—mobile phase introduction channel, 3—sampling channel port, 4—chromatographic column channel, 5—sample chip, 6—fluid driving device, 7—sealing sheet, 8—detection device, 9—moving stage, 10—sample, 11—chromatographic stationary phase, 12—chromatographic mobile phase, 13—chromatographic column channel outlet, 14—sampling droplet, 15—externally fabricated chromatographic column.

DETAILED DESCRIPTION OF EMBODIMENTS

The technical solutions of the present invention are further described below with reference to the specific embodiments, but the protection scope of the present invention is not limited herein.

The preferred embodiments according to the present invention are described below in detail with reference to the accompanying drawings.

Embodiment 1

Figure 1:
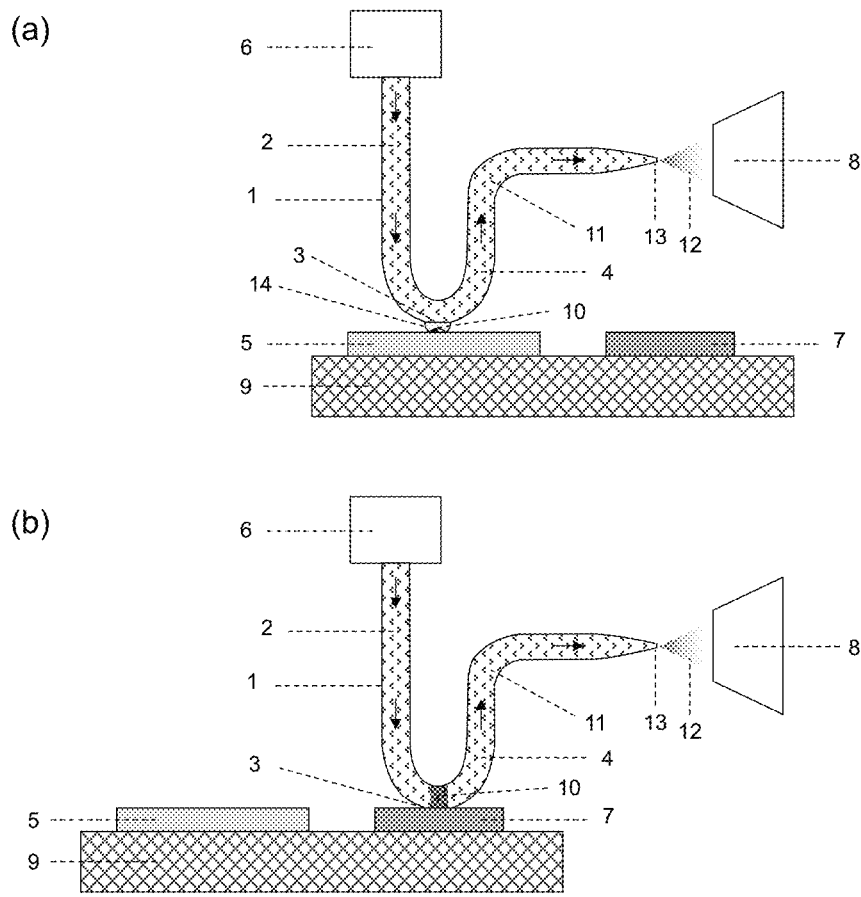
FIG. 1 is a schematic diagram of a chromatography-electrospray mass spectrometry analysis system using a capillary multifunctional integrated probe according to Embodiment 1. (a) is a schematic diagram of a system during sampling operation; and (b) is a schematic diagram of a system during sample injection operation.

FIG. 1 is a schematic diagram of a chromatography-electrospray mass spectrometry analysis system using a multifunctional integrated probe fabricated by a capillary tube according to the present invention. (a) is a schematic diagram of a system during sampling operation; and (b) is a schematic diagram of a system during sample injection operation. The system consists of a multifunctional integrated probe 1 based on a capillary tube, a set of movable sample chip 5 and sealing sheet 7, a moving stage 9 fixed with a sample chip 5 and the sealing sheet 7, a set of injection pump fluid driving device 6 and a mass spectrometer detection device 8. The arrowhead in FIG. 1 indicates a flow direction of a chromatographic mobile phase.

The multifunctional integrated probe 1 is fabricated by the capillary tube, has a U-shaped appearance and includes a mobile phase introduction channel 2, a sampling channel port 3 and a chromatographic column channel 4. The sampling channel port 3 is located on the outer side wall of the bent bottom of the U shape. The inner channel of the capillary tube is fabricated with a chromatographic column by the monolithic column method. In order to facilitate fabricating operation of the chromatographic column, the chromatographic stationary phase 11 fills part of the mobile phase introduction channel 2 and all of the sampling channel port 3 and the chromatographic column channel 4.

The material of the capillary tube for fabricating the probe is fused silica, the cross section is round, the inner diameter is 100 μm and the outer diameter is 365 μm. The specific fabricating steps are as follows: (1) the capillary tube is stretched by flame heating to obtain a hourglass-shaped structural section, wherein the minimum inner diameter is 30 μm to 50 μm.; (2) the capillary tube is bended by flame heating to obtain a prototype of a U-shaped sampling channel port 3, wherein the capillary tube between the minimum inner diameter position of the hourglass-shaped structural section and the bottom of the U-shaped sampling channel port 3 is 2 cm in length; (3) a monolithic column is synthesized in the capillary tube by an in-situ heat-initiated polymerization method; (4) the minimum inner diameter position of the hourglass-shaped structural section of the capillary tube is cut to obtain a chromatographic column channel outlet 13 of the capillary tube, wherein the outlet also serves as a spray needle of the electrospray mass spectrometry detection device 8, and the capillary tube is cut to make a distance between an injection port of the mobile phase introduction channel 2 of the multifunctional integrated probe 1 and the bottom of the U-shaped sampling channel port 3 be 9 cm; (5) the outer wall of the capillary tube is subjected to silanization treatment, so that the capillary tube has hydrophobicity; and (6) the capillary wall at the top end of a U-shaped protruded area of the sampling channel port 3 is ground to obtain a complete connecting sampling channel port 3, wherein the sampling channel port 3 is elliptic, and is 200 μm in long diameter and 100 μm in short diameter. For the detection of lipophilic samples, a hydrophilic ring with hydrophilicity formed by grinding around the sampling channel port 3 can effectively reduce cross contamination. For the detection of lipophilic samples, the hydrophilic ring with hydrophilicity formed by grinding around the sampling channel port 3 can be subjected to hydrophobic treatment, thus effectively reducing cross contamination.

The specific use method of the device in Embodiment 1 is as follows: (1) the sampling channel port 3 of the multifunctional integrated probe 1 and the sealing sheet 7 are in close contact and sealed by moving the moving stage 9 with the sample chip 5 and the sealing sheet 7 in three dimensions of x, y and z axes, thus preventing a mobile phase 12 from leaking out of the sampling channel port 3; (2) the close contact and sealed state between the sampling channel port 3 of the multifunctional integrated probe 1 and the sealing sheet 7 is maintained, the injection pump of the fluid driving device 6 is started, the chromatographic mobile phase 12 is continuously injected from the injection port of the mobile phase introduction channel 2 of the multifunctional integrated probe 1, passes through the sampling channel port 3 and the chromatographic column channel 4 and arrives at the outlet of the chromatographic column channel 4, and a high-voltage power supply of a mass spectrometer of the detection device 8 is started, so that the chromatographic mobile phase 12 is sprayed from the chromatographic column channel outlet 13 of the multifunctional integrated probe 1 to form stable electrospray; (3) the fluid driving device 6 is paused, the sampling channel port 3 of the multifunctional integrated probe 1 is removed from the sealing sheet 7 by moving the moving stage 9 in the three dimensions of x, y and z axes, the sampling channel port 3 forms a sampling droplet by the chromatographic mobile phase 12, so that the sampling channel port 3 of the multifunctional integrated probe is in contact with a solid or liquid sample 10 on the sample chip 5 through the sampling droplet, the sample 10 is dissolved with the sampling droplet 14, the sampling droplet 14 dissolved with the sample 10 is sampled by the sampling channel port 3 to enter the chromatographic column channel 4 in the multifunctional integrated probe 1 (FIG. 1A) by the suction action on the liquid in the channel of the multifunctional integrated probe 1 produced by the electrospray process, and the sample chip 5 is separated from the sampling channel port 3; (4) the sampling channel port 3 of the multifunctional integrated probe 1 and the sealing sheet 7 are in close contact and sealed by moving the moving stage 9 in the three dimensions of x, y and z axes, the fluid driving device 6 is started to provide the liquid chromatographic mobile phase 12, so that the sample entering the chromatographic column channel of the multifunctional integrated probe 1 is separated under driving of the liquid chromatographic mobile phase 12, is sprayed from the chromatographic column channel outlet 13 of the multifunctional integrated probe 1, is ionized under the action of an electric field and enters the mass spectrometer for detection (FIG. 1B); and (5) the steps (3) and (4) are repeated to complete sampling, sample injection and analysis of different samples 10 on the sample chip 5 or complete sampling, sample injection and analysis of the samples 10 on different sample chips 5.

In the process of fabricating and using the multifunctional integrated probe 1, the conditions of the multifunctional integrated probe 1 and the sample chip 5 are observed by a microscopic observation device.

Figure 2:
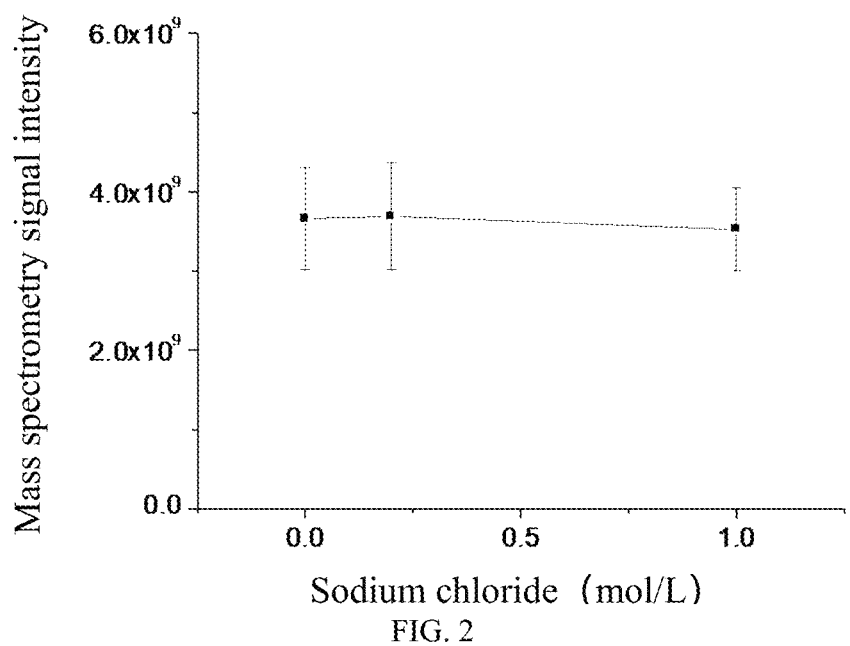
FIG. 2 is the electrospray mass spectrometry detection result of dry points of angiotensin II (Ang II) samples with different salt concentrations in a gradient elution mode by an analysis device and a use method thereof according to Embodiment 1.

FIG. 2 is the electrospray mass spectrometry detection result of dry points of angiotensin II (Ang II) samples with different salt concentrations in a gradient elution mode by an analysis device and a use method thereof according to Embodiment 1.

Specifically, the concentrations of sodium chloride in the droplets of the angiotensin II sample 10 are respective 0 M (mol/L), 0.2 M and 1.0 M, the original size of the droplet of the sample 10 is 20 nL, the sample droplets are naturally evaporated on the sample chip 5 to form white dots visible to white eyes, there are three sample droplets of each concentration; the chromatographic mobile phase 12 for sampling is 10% methanol and 0.1% formic acid solution (that is, the mobile phase consists of 10% of solution B and 90% of solution A), and the size of the sampling droplet is 30 nL; the sampling time is 3 minutes (that is, the time for the sampling droplet 14 to dissolve the sample); and the gradient of the chromatographic mobile phase 12 is: 10% to 80% of solution B (90% to 20% of solution A) at the 0-0.3 minute, 80% of solution B (20% of solution A) at the 0.3-0.5 minute, and 10% of solution B (90% of solution A) at the 0.5 minute. The solution A is 0.1% formic acid aqueous solution and the solution B is 0.1% formic acid methanol solution; and in the mass spectrometer of the detection device 8, the electrospray flow speed is 1.1 microliters per minute and the spray voltage is 1.7 kilovolts.

The peak area of a target signal in the salt-containing sample measured by the method in the embodiment has not significant change with the increase of the salt concentration. Since the sample containing sodium chloride cannot obtain an effective target signal in the direct electrospray experiment without pretreatment, it is proved that the system has high desalting capability and adapts to the direct sampling-sample injection-electrospray mass spectrometry detection of the high-salt sample. Meanwhile, the relative standard deviations of the peak area of the sample signals with three concentrations are respectively 17.7%, 18.4% and 14.8% and are within the acceptable range of the mass spectrometry detection, indicating that the system has high stability.

Figure 3:
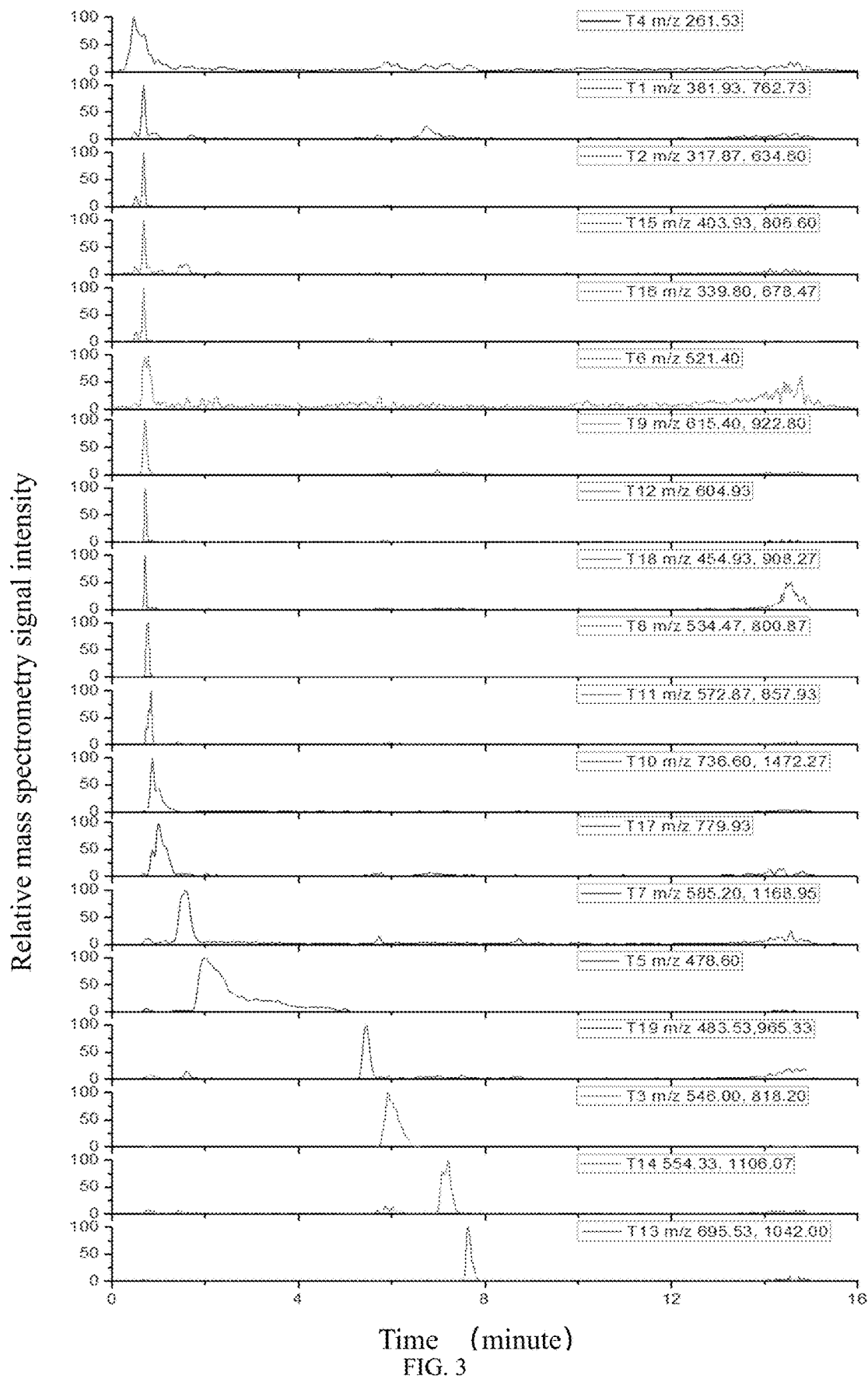
FIG. 3 is the in-situ mass spectrometry analysis result of a digest products obtained after cytochrome C protein is subjected to enzymolysis by trypsin in a droplet in a gradient elution mode by an analysis device and a use method thereof according to Embodiment 1.

FIG. 3 is the in-situ mass spectrometry analysis result of a product obtained after cytochrome C protein is subjected to enzymolysis by trypsin in a liquid drop in a gradient elution mode by an analysis device and a use method thereof according to an embodiment 1 of the present invention.

Specifically, the cytochrome C protein (Cyt. C) is subjected to trypsin enzymolysis reaction on the sample chip 5 covered with oil in the form of droplets, the size of the reaction droplet is 100 nL and the protein content of the droplet is 100 ng; after reaction, the droplet is subjected to oil-removing and solvent-removing treatment, and the reaction product serving as a measurement sample 10 remains on the sample chip 5 in the form of solid; the reaction product is subjected to in-situ sampling analysis by the analysis device, the chromatographic mobile phase 12 for sampling is a 5% methanol and 0.1% formic acid solution (that is, the mobile phase consists of 5% of solution B and 95% of solution A), and the size of the sampling droplet is 30 nL; the sampling time is 3 minutes; and the chromatographic gradient is: 5% to 95% of solution B (95% to 5% of solution A) at the 0-10th minute, 95% of solution B (5% of solution A) at the 10-15th minute, and 5% of solution B (95% of solution A) at the 15th minute. The solution A is 0.1% formic acid aqueous solution and the solution B is 0.1% formic acid methanol solution; and in the mass spectrometer of the detection device 8, the electrospray flow speed is 200 nL/min and the spray voltage is 2.3 kilovolts.

The above result proves that the system is applied to separation and analysis of the complex sample of the microreaction system.

Embodiment 2

Embodiment 2 is to utilize the multifunctional integrated probe and the use method in the preferred Embodiment 1 and add washing liquid to the sealing sheet 7 for cleaning the sampling channel port 3 of the multifunctional integrated probe 1 and stably forming the sampling droplet.

The specific use method of the analysis device shown in Embodiment 2 is as follows: (1) a certain amount of cleaning liquid with the same composition as that of the chromatographic mobile phase 12 is added on the sealing sheet 7 with super-hydrophobicity, wherein the cleaning liquid exists in the form of large droplets on the sealing sheet 7; (2) the sampling channel port 3 of the multifunctional integrated probe 1 and the sealing sheet 7 are in close contact by moving the moving stage 9 fixed with the sample chip 5 and the sealing sheet 7 in three dimensions of x, y and z axes, thus preventing the chromatographic mobile phase 12 from leaking out of the sampling channel port 3, wherein an outer wall of the sampling channel port 3 is immersed into the large droplets of the cleaning liquid; (3) the close contact state of the sampling channel port 3 of the multifunctional integrated probe 1 and the sealing sheet 7 is maintained, the fluid driving device 6 is started, the chromatographic mobile phase 12 is continuously injected from the mobile phase introduction channel 2 of the multifunctional integrated probe 1 and passes through the sampling channel port 3 and arrives at the sampling channel outlet 13 of the multifunctional integrated probe 1, and a high-voltage power supply of a mass spectrometer is started, so that an electrospray buffer solution is sprayed from the chromatographic column channel outlet 13 of the multifunctional integrated probe 1 to form stable electrospray; (4) the fluid driving device 6 is paused, the sampling channel port 3 is separated from the sealing sheet 7 by moving the moving stage 9 in the three dimensions of x, y and z axes, the sampling channel port 3 carries the sampling droplet 14 formed by the cleaning liquid, so that the sampling channel port 3 of the multifunctional integrated probe 1 is in contact with the sample 10 on the sample chip through sampling droplet 14, the sample is dissolved with the sampling droplet 14, the sampling droplet 14 dissolved with the sample 10 is sampled by the sampling channel port 3 and introduced into the chromatographic column channel 4 of the multifunctional integrated probe 1, and the sample chip 5 is naturally separated from the sampling channel port 3; (5) the sampling channel port 3 of the multifunctional integrated probe 1 and the sealing sheet 7 are in close contact by moving the moving stage 9 in three dimensions of x, y and z axes, wherein the sampling channel port 3 is immersed into the large droplets of the cleaning liquid for cleaning; and the fluid driving device 6 is started to provide a liquid chromatographic mobile phase 12, so that the sample 10 entering the chromatographic column channel 4 of the multifunctional integrated probe 1 is separated under elution of the liquid chromatographic mobile phase 12, is sprayed from the sampling channel outlet 13 of the multifunctional integrated probe 1, is ionized under the action of an electric field and enters the mass spectrometer 8 for analysis; and (6) the above steps (4) and (5) are repeated to complete sampling and analysis of different samples.

Specifically, three polypeptide samples are respectively YL-5, angiotensin II (Ang II) and angiotensin I (Ang I), the concentrations of which are all 200 femtomoles per liter; the control sample is a blank buffer solution without containing polypeptide; the original size of the droplet of the sample 10 is 20 nL, and the droplet is naturally evaporated on the sample chip 5 to form a dry point; the cleaning liquid and the chromatographic mobile phase is a 20% acetonitrile and 0.1% formic acid solution (that is, consisting of 20% of 0.1% formic acid acetonitrile solution and 80% of 0.1% formic acid aqueous solution), the volume of the cleaning liquid is 200 microliters, and the volume of the sampling droplet 14 is 30 nL; the sampling time is 1.3 minutes; and the electrospray flow speed is 480 nL/min and the spray voltage is 2.5 kilovolts. The droplet dry points of the three samples 10 and the droplet dry points of one control group are subjected to sampling analysis sequentially, and the intensity of cross pollution signals of the three samples 10 is 6% lower than that of the sample signal and is within an acceptable range of mass spectrometry detection.

The analysis result indicates that the system has low cross pollution, can be applied to continuous detection of a variety of samples and has the possibility of practical application.

By the multifunctional integrated probe and the analysis method in Embodiment 2, sampling of mouse brain, liver and kidney slices and analysis of a drug and two isomeric metabolites thereof are realized in an isocratic elution mode.

5 points of each of the mouse brain, liver and kidney slices were sampled and detected, wherein the size of the sampling droplet is 30 nL, the distance between the sampling port and the slice is 0.02 mm, the diameter of the sampling area is about 0.5 mm, the distance between the sampling points is 1 mm, the sampling time is 1.5 minutes and the detection time is 3.5 minutes; the cleaning liquid, the buffer solution and the chromatographic isocratic eluent are 15% methanol and 0.1% formic acid solution, the volume of the cleaning liquid is 200 microliters, and the size of the sampling droplet is 30 nL; and the electrospray flow rate is 240 nL/min, and the spray voltage is 2.4 kilovolts.

Signals of a drug and two isomeric metabolites thereof are detected in the mouse brain, liver and kidney slices, the mass spectrometry signal intensity of the drug molecule in the brain slice is obviously higher than the mass spectrometry signal intensity of the metabolite, while the mass spectrometry signal intensity of the metabolites in the liver and kidney slices is obviously higher than the mass spectrometry signal intensity of the drug, indicating that the metabolic capability of the liver and the kidney on propranolol is obviously higher than that of the brain. Moreover, the metabolism of the propranolol has selectivity, and the metabolic rate of aromatic hydroxypropranolol glucuronide is higher than the metabolic rate of aliphatic hydroxypropranolol glucuronide.

The embodiment proves that the system is suitable for pretreatment-free high-flux metabolome analysis of the actual biological slices and imaging analysis based on the liquid chromatographic-mass spectrometry technology.

Embodiment 3

Figure 4:
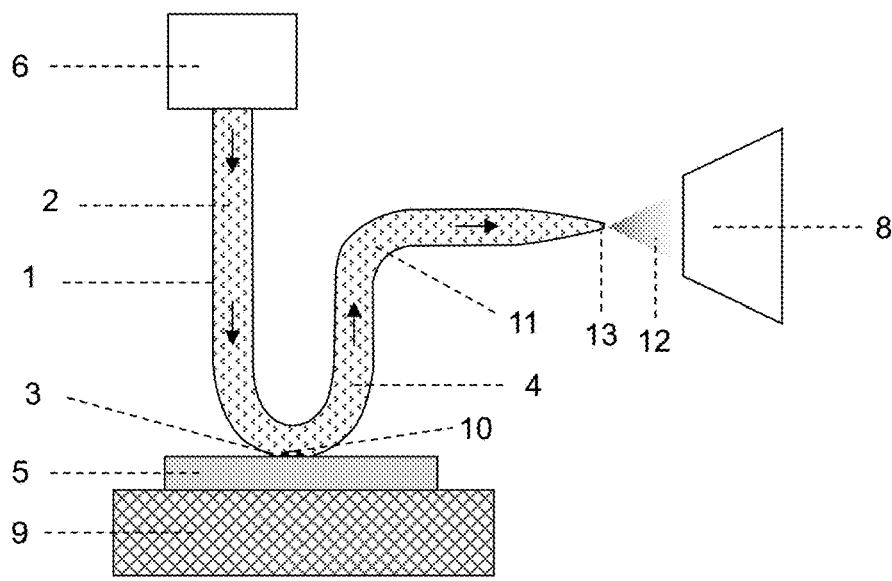
FIG. 4 is a schematic diagram of a chromatography-electrospray mass spectrometry analysis system using a capillary multifunctional integrated probe and a monolithic chromatographic column, which combines sampling operation and sample injection operation according to Embodiment 3.

FIG. 4 is a schematic diagram of a chromatography-electrospray mass spectrometry analysis system using a capillary multifunctional integrated probe and a monolithic chromatographic column, which combines sampling operation and sample injection operation under pressure according to Embodiment 3.

Figure 5:
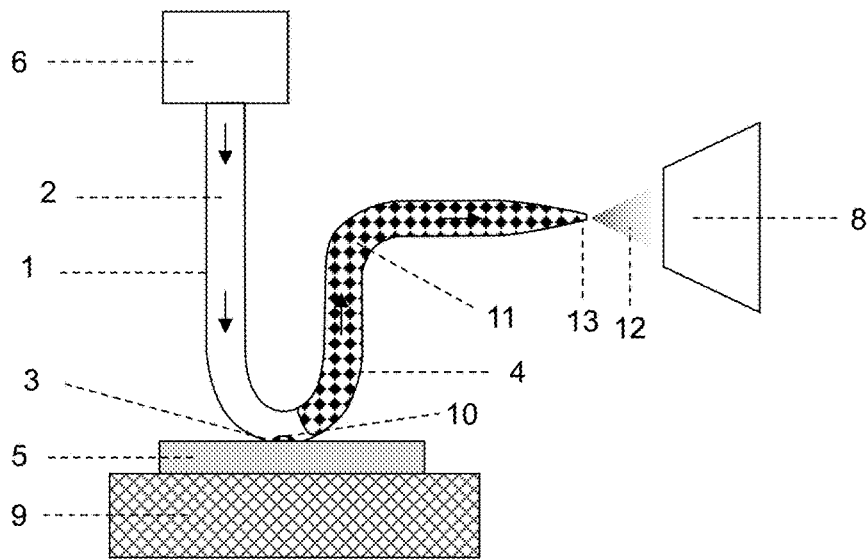
FIG. 5 is a schematic diagram of a chromatography-electrospray mass spectrometry analysis system using a capillary multifunctional integrated probe and a packed chromatographic column, which combines sampling operation and sample injection operation according to Embodiment 3.

FIG. 5 is a schematic diagram of a chromatography-electrospray mass spectrometry analysis system using a capillary multifunctional integrated probe and a packed chromatographic column, which combines sampling operation and sample injection operation under pressure according to Embodiment 3.

The system consists of a multifunctional integrated probe 1 based on a capillary tube, a set of movable sample chip 5 and sealing sheet 7, a moving stage 9 fixed with a sample chip 5, a set of fluid driving device 6 with a gradient elution function and a mass spectrometer detection device 8. The arrowhead in the figure indicates a flow direction of a chromatographic mobile phase 12. The sample chip 5 is fabricated by an elastic material such as polydimethylsiloxane (PDMS), so that the sample chip 5 can directly serve as a sealing sheet 7 and can be in close contact and sealed with the sampling channel port 3 on the multifunctional integrated probe 1 to complete the operation combining the in-situ sampling operation and the in-situ sample injection operation.

The multifunctional integrated probe 1 is fabricated by the capillary tube, has a U-shaped appearance and includes a mobile phase introduction channel 2, a sampling channel port 3 and a chromatographic column channel 4. The sampling channel port 3 is located on the outer side wall of the bent bottom of the U shape. The channel of the capillary tube is fabricated with a chromatographic column by the monolithic column method. In order to facilitate fabricating operation of the chromatographic column, the chromatographic stationary phase fills part of the mobile phase introduction channel 2 and all of the sampling channel port 3 and the chromatographic column channel 4.

The material of the capillary tube for fabricating the probe is fused silica, the cross section is round, the inner diameter is 75 μm and the outer diameter is 365 μm. The specific fabricating steps are as follows: (1) the sample is heated by flame to stretch the capillary tube to obtain a hourglass-shaped structural section, wherein the minimum inner diameter is 20 μm to 40 μm.; (2) the capillary tube is bended by flame heating to obtain a prototype of a U-shaped sampling channel port 3, wherein the distance between the minimum inner diameter position of the hourglass-shaped structural section and the bottom of the U-shaped sampling channel port 3 is 2 cm; (3) a monolithic column is synthesized in the capillary tube by an in-situ heat-initiated polymerization method (FIG. 4), or a chromatographic column is fabricated by a method for filling the chromatographic column channel part of the capillary tube with the chromatographic stationary phase 11 (FIG. 5); (4) the capillary tube is cut at the minimum inner diameter position of the hourglass-shaped structural section to obtain a chromatographic column channel outlet 13, wherein the outlet serves as a spray needle port of the electrospray mass spectrometry detection device 8; and the capillary tube is cut to make a distance between an injection port of the mobile phase introduction channel 2 of the multifunctional integrated probe 1 and the bottom of the U-shaped sampling channel port 3 be 9 cm; (5) an outer wall of the capillary tube is subjected to silanization treatment, so that the capillary tube has hydrophobicity; and (6) the capillary wall at the top end of a U-shaped protruded area of the sampling channel port 3 is ground to obtain a complete connected sampling channel port 3, wherein the sampling channel port 3 is elliptic, and is 150 μm in long diameter and 75 μm in short diameter. The outer wall of the U-shaped sampling channel port of the capillary probe 1 or all the outer wall of the capillary probe 1 is coated or added with a hard glue, and the mechanical strength of the capillary probe 1 is enhanced after the glue is solidified, thereby realizing higher pressure-resistant sealing between the capillary probe 1 and the sample chip 5.

The specific use method of the device in the embodiment 3 is as follows: (1) firstly, the liquid sample 10 is added in an area of the sample 10 of the sample chip 5, a reagent is added into the sample 10 to react with the sample 10, and a solvent of the sample reaction liquid after reaction is evaporated to become a solid dry point; (2) the sampling channel port 3 of the multifunctional integrated probe 1 and the area of the sample 10 of the sample chip 5 are in close contact and sealed by moving the moving stage 9 fixed with the sample chip 5 in three dimensions of x, y and z axes; (3) the close contact state between the sampling channel port 3 of the multifunctional integrated probe 1 and the sample chip 5 is maintained, the fluid driving device 6 is started, the chromatographic mobile phase 12 with low elution capability (such as water or a methanol or acetonitrile aqueous solution with low concentration) is continuously introduced from the mobile phase introduction channel 2 of the multifunctional integrated probe 1 and passes through the sampling channel port 3, and the mobile phase 12 dissolves the solid sample 10 at the sample 10 position on the sample chip 5, the dissolved sample enters the chromatographic stationary phases 11 in the sampling channel port 3 and the chromatographic column channel 4, that is, the sample 10 is concentrated and enriched on the chromatographic stationary phase 11 of the sampling channel port 3, wherein the above operation combines the in-situ sampling operation and the in-situ sample injection operation; (4) the fluid driving device 6 is adjusted, the chromatographic mobile phase with higher elution capability (such as a methanol or acetonitrile aqueous solution with higher concentration) is used gradually, the sample 10 entering the chromatographic column channel 4 is subjected to step-by-step elution, is sprayed from the chromatographic column channel outlet 13 of the multifunctional integrated probe 1, is ionized under the action of the electric field and enters the mass spectrometer for detection; and (5) the above steps (2), (3) and (4) are repeated to complete sampling, sample injection and analysis of different samples 10 on the sample chip 5 or complete sampling, sample injection and analysis of the samples 10 on different sample chips 5.

In the process of fabricating and using the multifunctional integrated probe 1, the conditions of the multifunctional integrated probe 1 and the sample chip 5 are observed by a microscopic observation device.

Embodiment 4

Figure 6:
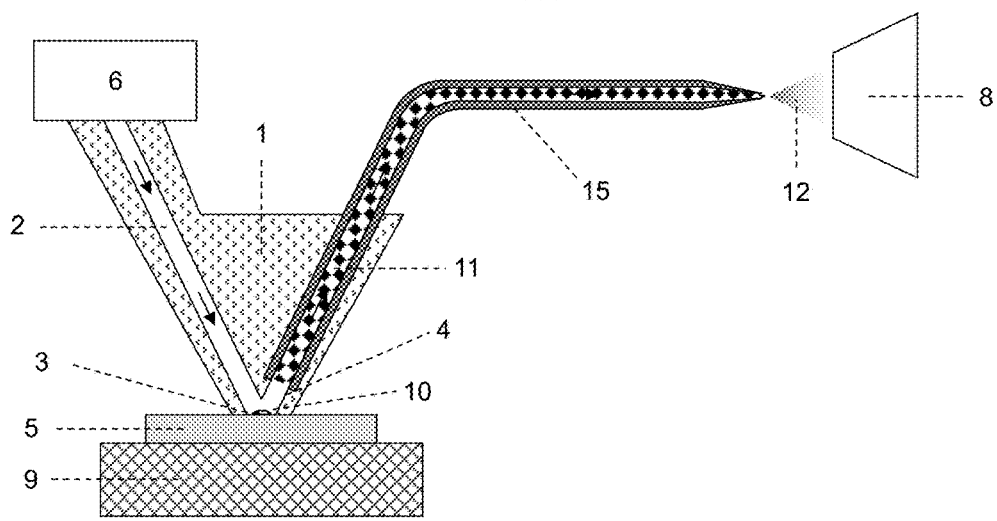
FIG. 6 is a schematic diagram of a chromatography-electrospray mass spectrometry analysis device system using a multifunctional integrated probe fabricated by an integral module and a packed chromatographic column according to Embodiment 4.

FIG. 6 is a schematic diagram of a chromatography-electrospray mass spectrometry analysis system using a capillary multifunctional integrated probe fabricated by an integral module and a packed chromatographic column according to Embodiment 4.

The system consists of a multifunctional integrated probe 1 fabricated by a hard material, a movable sample chip 5, a moving stage 9 fixed with the sample chip 5, a set of fluid driving device 6 with a gradient elution function and a mass spectrometer detection device 8. The arrowhead in the figure indicates a flow direction of a chromatographic mobile phase 12. The sample chip 5 is fabricated by an elastic material such as polydimethylsiloxane (PDMS) or polytetrafluoroethylene (PTFE), etc., so that the sample chip 5 can directly serve as a sealing sheet 7 and can be in close contact and sealed with the sampling channel port 3 on the multifunctional integrated probe 1 to complete the operation combining the in-situ sampling operation and the in-situ sample injection operation.

The multifunctional integrated probe 1 is integrally fabricated by a hard material such as a polyether-ether-ketone (PEEK) material or a stainless steel material, has a nearly inverted triangle appearance and includes a mobile phase introduction channel 2, a sampling channel port 3 and a chromatographic column channel 4. The sampling channel port 3 is located at the inverted triangle and is 100 μm to 200 μm in width. To facilitate fabricating, the integral multifunctional integrated probe 1 in the embodiment 4 is modified by a commercial three-way or four-way device. The chromatographic column 15 is prepared outside in advance by a method for packing the capillary tube with an inner diameter of 50 μm with a C18 chromatographic stationary phase 11. The outlet of the externally fabricated chromatographic column 15 is subjected to pulling treatment to form a sharp tip served as a spray needle of the electrospray mass spectrometry detection device 8. The chromatographic column 15 is fixed on the multifunctional integrated probe 1 through a high-pressure resistant interface with a small dead volume, and the channel of the chromatographic column 15 communicates with the chromatographic column channel 4 of the multifunctional integrated probe 1 to jointly form a complete integrated chromatographic column channel 4.

The specific use method of the device in the embodiment 4 is as follows: (1) firstly, the liquid sample 10 is added in an area of the sample 10 of the sample chip 5, a reagent is added into the sample 10 to react with the sample 10, and a solvent of the sample reaction liquid after reaction is volatilized to become a solid dry point; (2) the sampling channel port 3 of the multifunctional integrated probe 1 and the area of the sample 10 of the sample chip 5 are in close contact and sealed by moving the moving stage 9 fixed with the sample chip 5 in three dimensions of x, y and z axes; (3) the close contact state between the sampling channel port 3 of the multifunctional integrated probe 1 and the sample chip 5 is maintained, the fluid driving device 6 is started, the chromatographic mobile phase 12 with low elution capability (such as water or a methanol or acetonitrile aqueous solution with low concentration) is continuously injected from the mobile phase introduction channel 2 of the multifunctional integrated probe 1 and passes through the sampling channel port 3, and the mobile phase 12 dissolves a solid sample 10 at the sample 10 position on the sample chip 5, the dissolved sample enters the chromatographic stationary phases 11 at the inlet end of the externally fabricated chromatographic columns 15 in the sampling channel port 3 and the chromatographic column channel 4, and the sample 10 is concentrated and enriched on the chromatographic stationary phase 11 at the inlet end of the externally fabricated chromatographic column 15, wherein the above operation combines the in-situ sampling operation and the in-situ sample injection operation; (4) the fluid driving device 6 is adjusted, the chromatographic mobile phase with higher elution capability (such as a methanol or acetonitrile aqueous solution with higher concentration) is used gradually, the sample 10 entering the chromatographic column channel 4 is subjected to step-by-step elution, is sprayed from the outlet 13 of the externally fabricated chromatographic column 15 of the multifunctional integrated probe 1, is ionized under the action of the electric field and enters the mass spectrometer for detection; and (5) the above steps (2), (3) and (4) are repeated to complete sampling, sample injection and analysis of different samples 10 on the sample chip 5 or complete sampling, sample injection and analysis of the samples 10 on different sample chips 5.

What is claimed is:

1. A chromatographic analysis device based on a multifunctional integrated probe, comprising a fluid driving device and a detection device, and further comprising:
    a sample chip, configured to load at least one samples;
    a micro-structure or a micro-area for loading the sample on the sample chip;
    a probe, having a mobile phase introduction channel, a sampling channel port, a chromatographic column channel and a chromatographic column channel outlet, an outlet of the mobile phase introduction channel connecting with an inlet of the chromatographic column channel at a connection position, and the sampling channel port being formed at the connection position;
    a chromatographic stationary phase located in the probe, wherein the chromatographic stationary phase fills at least one of the following: part of the mobile phase introduction channel, all of the sampling channel port, and all of the chromatographic column channel;
    a sealing sheet configured to seal the sampling channel port;
    a moving stage fixed with at least one of the samples and the probe, configured to adjust relative position between the sample chip and the probe, wherein
        the probe has a U-shaped structure or a V-shaped structure formed by bending a capillary tube, the sampling channel port is formed at the bottom of the U-shaped structure or the V-shaped structure, the capillary tube parts on two sides of the sampling channel port are the mobile phase introduction channel and the chromatographic column channel respectively,
        the mobile phase introduction channel and the chromatographic column channel are arranged in a U shape, a V shape, an approximate U shape or an approximate V shape; and
    an inlet of the mobile phase introduction channel is connected to the fluid driving device, and the chromatographic column channel outlet corresponds to a position of the detection device, wherein
        the moving stage is configured to make the sampling channel port on the probe in contact with the sealing sheet and sealed by the sealing sheet,
        the fluid driving device is configured to inject a chromatographic mobile phase, from the inlet of a mobile phase introduction channel of the probe, to pass through the sampling channel port, enter the chromatographic column channel and flow out of the chromatographic column channel outlet,
        the detection device of a chromatographic system is configured to acquire a stable detection signal,
        the fluid driving device is configured to pause,
        the moving stage is configured to make the sampling channel port on the probe out of contact with the sealing sheet and make a sampling droplet formed outside the sampling channel port be in contact with the sample of the micro-structure or micro-area carried on the sample chip, to dissolve the sample into the sampling droplet, and introduce the sampling droplet dissolved with the sample into the chromatographic column channel and the chromatographic stationary phase in the chromatographic column channel by a surface tension of the sampling droplet, a capillary force in the chromatographic column channel, a suction force from the chromatographic column channel outlet or a suction force from the probe, the moving stage is configured to make the sampling droplet at the sampling channel port on the probe out of contact with the sample chip, the moving stage is configured to make the sampling channel port on the probe in contact with the sealing sheet and seal the sampling channel port with the sealing sheet, the fluid driving device is configured to inject the chromatographic mobile phase from the inlet of the mobile phase introduction channel of the probe, to pass through the sampling channel port, carry the sampling droplet dissolved with the sample to enter the chromatographic column channel and the chromatographic stationary phase in the chromatographic column channel, separate components in the sample, and enable the separated components in the sample to flow out from the chromatographic column channel outlet, and the detection device of the chromatographic system is configured to acquire the detection signal of the separated components.

2. The chromatographic analysis device based on the multifunctional integrated probe according to claim 1, wherein the probe has a structure integrating the mobile phase introduction channel, the sampling channel port, the chromatographic column channel and the chromatographic column channel outlet.

3. The chromatographic analysis device based on the multifunctional integrated probe according to claim 1, comprising:
a probe body with the mobile phase introduction channel, the sampling channel port and the chromatographic column channel; and
the chromatographic column, one end of the chromatographic column being connected with the chromatographic column channel.

4. The chromatographic analysis device based on the multifunctional integrated probe according to claim 1, wherein a top surface of the sample chip has elasticity or is mounted by an elastic sealing material.

5. The chromatographic analysis device based on the multifunctional integrated probe according to claim 1, wherein the detection device is used in a spectroscopic analysis method, an electrochemical analysis method, a mass spectrometry analysis method, or a combination thereof.

6. The chromatographic analysis device based on the multifunctional integrated probe according to claim 1, wherein the probe is formed by bending a capillary tube, and an outer part of the capillary tube is coated or filled with a material capable of enhancing structural strength of the capillary tube; or the probe is integrally fabricated from a solid material or a microfluidic chip.

7. The chromatographic analysis device based on the multifunctional integrated probe according to claim 1, wherein an inner diameter or an inner side length of each of the mobile phase introduction channel, the chromatographic column channel and the sampling port ranges from 0.05 μm to 1 cm.

8. The chromatographic analysis device based on the multifunctional integrated probe according to claim 1, wherein a probe array comprises multiple probes.

9. A method for analyzing a sample, performing analysis by: driving a mobile phase in a probe by a fluid driving device under the condition that a sampling channel port of the probe is sealed; dissolving a sample carried on a sample chip by the mobile phase located at the sampling channel port under the normal pressure or by the mobile phase flowing through the sampling channel port under the condition that the sampling channel port of the probe is sealed by the sample chip, and performing sample injection by flowing the dissolved sample into a chromatographic column channel; driving the mobile phase by the fluid driving device under the condition that the sampling channel port of the probe is sealed to separate the sample entering the chromatographic column channel; and detecting the separated sample by the detection device;

wherein the method for analyzing the sample comprises:
(a) adding the sample to a micro-structure or a micro-area for loading the sample on the sample chip;
(b) performing a series of pretreatment and reaction steps to the sample loaded on the sample chip;
(c) fixing at least one of the sample and the probe to a moving stage;
(d) moving the moving stage to make the sampling channel port on the probe in contact with a sealing sheet and sealed by the sealing sheet; starting the fluid driving device, injecting a chromatographic mobile phase from an inlet of a mobile phase introduction channel of the probe, passing through the sampling channel port, entering the chromatographic column channel and flowing out of a chromatographic column channel outlet; and starting a detection device of a chromatographic system to acquire a stable detection signal;
(e) pausing the fluid driving device, moving the moving stage to make the sampling channel port on the probe out of contact with the sealing sheet and make a sampling droplet formed outside the sampling channel port in contact with a sample of the micro-structure or micro-area carried on the sample chip, dissolving the sample into the sampling droplet, and introducing the sampling droplet dissolved with the sample into the chromatographic column channel and a chromatographic stationary phase in the chromatographic column channel by a surface tension of the sampling droplet, a capillary force in the chromatographic column channel, a suction force from the chromatographic column channel outlet or a suction force from the probe; and moving the moving stage to take the sampling droplet at the sampling channel port on the probe out of contact with the sample chip;
(f) moving the moving stage to make the sampling channel port on the probe in contact with the sealing sheet and seal the sampling channel port with the sealing sheet; starting the fluid driving device, injecting the chromatographic mobile phase from the inlet of the mobile phase introduction channel of the probe, passing through the sampling channel port, carrying the sampling droplet dissolved with the sample to enter the chromatographic column channel and the chromatographic stationary phase in the chromatographic column channel, separating components in the sample, and enabling the separated components in the sample to flow out from a chromatographic column channel outlet; and starting the detection device of the chromatographic system to acquire a detection signal of the separated components; and (g) repeating the above operation steps from (a) to (f) to complete sampling and analysis of different samples on the chip, different surface locations on the sample chip where the sample is located, or samples on different chips, wherein the step (b) can be omitted.

10. The method for analyzing the sample according to claim 9, comprising the following steps:
(a) adding the sample to a micro-structure or a micro-area for loading the sample on the sample chip;
(b) performing pretreatment and reaction operation to the sample loaded on the sample chip;
(c) fixing at least one of the sample chip and the probe to a moving stage;
(d) moving the moving stage to make the sampling channel port on the probe in contact with the micro-structure or micro-area for loading the sample on the sample chip and seal the sampling channel port with the sample chip;
(e) starting the fluid driving device, injecting a chromatographic mobile phase from the inlet of the mobile phase introduction channel of the probe, passing through the sampling channel port, carrying the sample carried on the micro-structure or micro-area on the sample chip to enter the chromatographic column channel and a chromatographic stationary phase in the chromatographic column channel, separating components in the sample, and enabling the separated components in the sample to flow out from the chromatographic column channel outlet; and starting the detection device of a chromatographic system to acquire detection signals of the separated components.

11. The method for analyzing the sample according to claim 9, wherein the sample loaded on the sample chip is a liquid sample or solid sample.

12. The method for analyzing the sample according to claim 9, wherein the sample is first added to the micro-structure or micro-area of the sample chip and then subjecting the sample to the series of sample pretreatment and reaction steps before acquiring the detection signal, or first subjecting the sample to the series of sample pretreatment and reaction steps on other devices before adding the sample to the sample chip and acquiring the detection signal.

13. The method for analyzing the sample according to claim 9, wherein the stationary phase of the chromatographic column channel is fabricated or filled into part or all of the space of the mobile phase introduction channel and the sampling channel port.

14. The method for analyzing the sample according to claim 9, wherein the composition and flow rate of the mobile phase for carrying or eluting the sample to enter the chromatographic column channel for separation and analysis are the same as or different from the composition and flow rate of the mobile phase used for subsequent chromatographic separation, or injecting the sample using a gas mobile phase and then conducting chromatographic separation by a liquid mobile phase.

* * * * *